United States Patent
Delbom et al.

(10) Patent No.: US 12,315,225 B2
(45) Date of Patent: May 27, 2025

(54) BALANCING MULTI-TASK LEARNING THROUGH CONDITIONAL OR PARALLEL BATCH MINING

(71) Applicant: Axis AB, Lund (SE)

(72) Inventors: Axel Delbom, Lund (SE); Mattis Lorentzon, Lund (SE)

(73) Assignee: AXIS AB, Lund (SE)

( * ) Notice: Subject to any disclaimer, the term of this patent is extended or adjusted under 35 U.S.C. 154(b) by 511 days.

(21) Appl. No.: 17/720,513

(22) Filed: Apr. 14, 2022

(65) Prior Publication Data

US 2022/0383624 A1     Dec. 1, 2022

(30) Foreign Application Priority Data

May 25, 2021    (EP) ..................................... 21175738

(51) Int. Cl.
*G06V 10/77* (2022.01)
*G06V 10/774* (2022.01)

(52) U.S. Cl.
CPC ........ *G06V 10/7715* (2022.01); *G06V 10/774* (2022.01)

(58) Field of Classification Search
CPC .......... G06N 3/08; G06N 20/00; G06N 3/048; G06V 10/82; G06V 10/7715; G06V 10/774
See application file for complete search history.

(56) References Cited

U.S. PATENT DOCUMENTS

| | | | |
|---|---|---|---|
| 11,915,415 B2* | 2/2024 | Shang | G06T 7/0012 |
| 12,045,727 B2* | 7/2024 | Min | G10L 15/22 |
| 2019/0114481 A1* | 4/2019 | DeChant | G06V 10/764 |
| 2019/0130275 A1* | 5/2019 | Chen | G06N 3/047 |
| 2020/0331448 A1* | 10/2020 | Perigord | B60T 17/22 |
| 2020/0334520 A1* | 10/2020 | Chen | G06F 40/20 |

(Continued)

FOREIGN PATENT DOCUMENTS

WO     2018/184195 A1     10/2018

OTHER PUBLICATIONS

Y. Li, Y. Song, and J. Luo, "Improving pairwise ranking for multi-label image classification," in Proceedings of the IEEE conference on computer vision and pattern recognition, (Year: 2017).*

(Continued)

*Primary Examiner* — Shaghayegh Azima

(74) *Attorney, Agent, or Firm* — Volpe Koenig

(57) ABSTRACT

Methods, systems, and computer program products, for training a multitask neural network. First and second datasets are provided, containing samples for a first task and a second task, respectively. First and second batch miners are provided for mining samples from the first and second datasets. First and second costs for completing the first and second tasks, respectively, are assessed using a first sample mined by the first batch miner from the first dataset and a second sample mined by the second batch miner from the second dataset. When the first or second cost, respectively, falls within a range delimited by lower and upper thresholds, the is added to a first or second batch, respectively. When a termination condition is reached for either the first or second batch, the first or the second batch is used to update the neural network.

11 Claims, 2 Drawing Sheets

(56) References Cited

U.S. PATENT DOCUMENTS

| | | | |
|---|---|---|---|
| 2021/0133518 A1* | 5/2021 | Yao | G06V 30/19173 |
| 2022/0036128 A1* | 2/2022 | Levanony | G06F 18/24 |
| 2022/0188568 A1* | 6/2022 | Singh | G06F 18/2148 |
| 2024/0013506 A1* | 1/2024 | Yao | G06V 30/19173 |

OTHER PUBLICATIONS

T. Wang and S.-C. Chen, "Multi-Label Multi-Task Learning with Dynamic Task Weight Balancing," 2020 IEEE 21st International Conference on Information Reuse and Integration for Data Science (IRI), Las Vegas, NV, USA, (Year: 2020).*

Extended European Search Report dated Nov. 10, 2021 for European Patent Application No. 21175738.0.

Bari et al., "MultiMix: A Robust Data Augmentation Framework for Cross-Lingual NLP," arXiv: Computation and Language (2020).

Wang et al., "Multi-Label Multi-Task Learning with Dynamic Task Weight Balancing," 2020 IEEE 21st International Conference on Information Reuse and Integration for Data Science (IRI) (2020).

Jean et al., "Adaptive Scheduling for Multi-Task Learning," ArXiv abs/1909.06434 (2019).

Avramova, "Curriculum Learning with Deep Convolutional Neural Networks," Dissertation, (2015).

Pilault et al., "Conditionally Adaptive Multi-Task Learning: Improving Transfer Learning in NLP Using Fewer Parameters & Less Data," (Sep. 2020).

Dong et al., "Imbalanced Deep Learning by Minority Class Incremental Rectification" (2018).

Hoffer et al., "Train longer, generalize better: closing the generalization gap in large batch training of neural networks," (2018).

Crawshaw, "Multi-Task Learning with Deep Neural Networks: A Survey," ArXiv abs/2009.09796 (2020).

* cited by examiner

BALANCING MULTI-TASK LEARNING THROUGH CONDITIONAL OR PARALLEL BATCH MINING

FIELD OF INVENTION

The present disclosure relates to machine learning, and more specifically to multi-task learning in a machine learning system.

TECHNICAL BACKGROUND

Machine learning (ML) is the study of computer algorithms that improve through experience and by the use of data. ML is generally considered a part of Artificial Intelligence (AI). Machine learning algorithms build a model based on sample data, known as "training data," in order to make predictions or decisions without being explicitly programmed to do so. Machine learning algorithms are used in a wide variety of applications, such as in medicine, email filtering, and computer vision, where it is difficult or unfeasible to develop conventional algorithms to perform the needed tasks. In the area of image processing, a common application of ML is to detect various features of an image. For example, in images depicting a captured scene, ML can be used to achieve better detection of people, vehicles, or colors of clothing items, for example.

Typically, ML systems are trained on specific tasks, for example, one ML system may be trained on discovering people, while another may be trained on detecting colors, etc. However, since many of these tasks might share parameters, it is often preferable to have a single ML system that can perform multiple tasks using shared parameters in a common backbone. Various attempts have been made to address this issue.

One common approach uses an iterative ML training technique. Each task has its own dataset representing what the ML system should try to understand, e.g., a number of images depicting scenes with various objects. The images in the dataset are annotated with a "ground truth" for each image, e.g., "the ML system should produce the color red" or "the ML system should identify a bicycle," etc. Each task, has a loss function which has been defined beforehand, which is used by the ML model to update its parameters. For example, if the ML system during training generates a result saying that the color is 75% red, whereas the ground truth for the image says the color is 100% red, the loss function is used to update various ML parameters, such that a better result that is closer to the ground truth is obtained the next time the task is performed. When there are multiple tasks, tasks 1, 2 and 3, say, the tasks are run iteratively (1-2-3, 1-2-3, 1-2-3 . . . , and so on) with their respective datasets. After each task, the ML parameters are updated, with the eventual goal of achieving a system that performs well on all tasks.

A problem with this ML model is that there may be situations where the ML system performs one particular task, or a subset of tasks, really well, while other tasks underperform. That is, Task 1 gets much more "influential" over the ML system during training compared to Task 2 or Task 3, and the end result is an unbalanced multi-task system. Some attempts have been made to avoid this by using "manual hand tuning" techniques, where users try to determine specific sequences of running the tasks, which result in a balanced system. However, this becomes increasingly difficult and often unmanageable as the number of tasks to be handled by the system increases. Thus, there is a need for improved ways to train multi-task ML systems.

SUMMARY

According to a first aspect, the disclosure relates to a method for training a multitask neural network. The method comprises:
  providing at least a first dataset containing samples for a first task, and a second dataset containing samples for a second task;
  providing a first batch miner for mining samples from the first dataset, and a second batch miner for mining samples from the second dataset;
  assessing a first cost for completing the first task, using a first sample mined by the first batch miner from the first dataset;
  assessing a second cost for completing the second task, using a second sample mined by the second batch miner from the second data set;
  if the first cost falls within a range delimited by a first lower threshold and a first upper threshold, adding the first sample to a first batch;
  if the second cost falls within a range delimited by a second lower threshold and a second upper threshold, adding the second sample to a second batch;
  in response to reaching a termination condition for either the first batch or the second batch, using the first batch or the second batch to update the neural network.

This method creates batches that can be used to train the neural network for the different tasks. The batch miners mine samples from the first and second dataset, respectively, and the cost of the individual mined samples are assessed by the neural network. If the cost of processing a task using the sample is deemed to be "just right," as defined by an upper and a lower threshold for the task, the sample is added to a batch for that task. Otherwise, the sample is discarded. Once a batch is complete, the batch is used to train the neural network for that particular task.

Using this method of selecting samples to be included in the training sets (i.e., batches) for the neural network, ensures that each task at any given moment is trained at a "Goldilocks level," that is, a level that is neither too easy nor too difficult for the neural network. Since all the tasks in the multi-task neural network are challenged at a comparable level at any given time, the above described problem with one task outshining the other tasks can be avoided, or at least significantly mitigated. Further, this can occur automatically without any manual intervention and, as such, more consistent and accurate training of the neural network can be accomplished.

Yet further, using batches for training has the advantage that the training can be done more rapidly. Having a large body of data when training the neural network is beneficial, as it is possible to attenuate the influence of outliers, such that individual samples are not attributed too much influence. For example, if an individual "bad image" was used as a sample in training a neural network, it would influence the neural network parameters as much as an individual "good image" would, which is undesirable. These types of situations can be avoided through batch training, which allows the focus to be placed on solving the "general problem" that is represented by the batch. In addition, training with batches usually decreases the training time.

According to one embodiment, the method further comprises repeating the assessing and adding steps until the termination condition is reached, and wherein the termination condition includes the first batch or the second batch reaching a pre-determined size, and/or a pre-determined number of repetitions of the assessing and adding steps has been performed. There are various ways to determine when a batch is ready to be used for training the neural network. In one embodiment, samples are added to a batch until the batch reaches a predetermined size. This batch size may be determined either automatically or by a user, depending on the particular system, task, and/or training situation at hand. Alternatively, a batch can be deemed complete when a certain number of samples have been processed. This may result in batches for different tasks having different sizes, and/or it may result in different batches that are created for the same task at different times varying in size. Having these different methods of determining when a batch is complete creates flexibility for a user when determining how to train a particular neural network for a particular task.

According to one embodiment, assessing a first cost and assessing a second cost are performed in sequence, one after another. This creates a "racing condition" of sorts between the batch miners, such that the first batch that reaches the termination condition is used to update the neural network. This will allow tasks to refrain from making additional changes to the model once they have reached high performance (i.e., avoiding overfitting), allowing tasks which have not yet reached high performance to take priority. Changing the model for one task will affect the performance for other tasks, and to make sure that the task performance does not drop due to changes made by other tasks, batch mining will continue to run for this task. This acts as a kind of regulator, keeping all task performance at a stable high level.

According to one embodiment, assessing a first cost and assessing a second cost are performed in parallel, and wherein the batch that is completed first is used to update the neural network. That is, all the batch miners (for each task) operate simultaneously in parallel, and the batch that first reaches the termination condition is used to update the neural network. The batches are then reset, and the process starts over. An advantage with this approach is that if the neural network gets too good at a particular task, all samples picked by its batch miner will be too easy and discarded, meaning that the corresponding batch will take longer time to complete. This means that the training of the neural network will be balanced (that is, at any given time the neural network will have a similar performance for each task).

According to one embodiment, the method further comprises starting a new first batch after the first batch has been used to update the neural network, and starting a new second batch after the second batch has been used to update the neural network. By constantly creating new batches that are composed of different samples, the neural network can be appropriately challenged during training.

According to one embodiment, the samples in the first dataset and the second dataset are annotated images. This training method is particularly suitable in situations where the samples are images. The images can be obtained, for example, from a surveillance camera. Such images are often subject to multi-task image recognition processes. For example, in a surveillance setting, a user may be interested in automatic recognition of people and vehicles to gain maximum usage of the system. Being really good recognizing people, and really bad at recognizing vehicles or other objects, may not adequately address the users need, so having a well-balanced system that is appropriately trained on both tasks is essential.

According to one embodiment, the first and second costs are assessed by processing the samples by the neural network and comparing a result of the processing with respect to a ground truth for a processed sample. The concept of a ground truth is well known in the field, and there are many existing algorithms for comparing the output of a neural network with a ground truth. Thus, leveraging the existing methods for purposes of determining a cost of an image makes it easier to incorporate various embodiments of the disclosure in existing systems for training multi-task neural networks.

According to one embodiment, the first lower threshold is the same as the second lower threshold, and the first higher threshold is the same as the second higher threshold. That is, the level of "complexity" that a sample must have in order to be included in a batch can be set to be the same for different tasks. This further enables a more balanced training of the multi-task neural network.

According to one embodiment, the number of samples in the first batch is equal to the number of samples in the second batch. Batches can have different sizes, for example, depending on the task for which the system is to be trained. This can sometimes be useful as batches that are too large may result in too much of an averaging out effect such that no meaningful information can be obtained to tune the system parameters.

According to a second aspect, the disclosure relates to a computer program product for training a multitask neural network. The computer program contains instructions corresponding to the steps of:
  providing at least a first dataset containing samples for a first task, and a second dataset containing samples for a second task;
  providing a first batch miner for mining samples from the first dataset, and a second batch miner for mining samples from the second dataset;
  assessing a first cost for completing the first task, using a first sample mined by the first batch miner from the first dataset;
  assessing a second cost for completing the second task, using a second sample mined by the second batch miner from the second data set;
  if the first cost falls within a range delimited by a first lower threshold and a first upper threshold, adding the first sample to a first batch;
  if the second cost falls within a range delimited by a second lower threshold and a second upper threshold, adding the second sample to a second batch;
  in response to reaching a termination condition for either the first batch or the second batch, using the first batch or the second batch to update the neural network.

The computer program involves advantages corresponding to those of the method and may be varied similarly.

According to a third aspect, the disclosure relates to a system for training a multitask neural network. The system includes a memory and a processor. The memory contains instructions that when executed by the processor causes the processor to perform a method that includes:
  providing at least a first dataset containing samples for a first task, and a second dataset containing samples for a second task;
  providing a first batch miner for mining samples from the first dataset, and a second batch miner for mining samples from the second dataset;
  assessing a first cost for completing the first task, using a first sample mined by the first batch miner from the first dataset;

assessing a second cost for completing the second task, using a second sample mined by the second batch miner from the second data set;

if the first cost falls within a range delimited by a first lower threshold and a first upper threshold, adding the first sample to a first batch;

if the second cost falls within a range delimited by a second lower threshold and a second upper threshold, adding the second sample to a second batch;

in response to reaching a termination condition for either the first batch or the second batch, using the first batch or the second batch to update the neural network.

The system advantages correspond to those of the method and may be varied similarly.

The details of one or more embodiments of the disclosure are set forth in the accompanying drawings and the description below. Other features and advantages of the disclosure will be apparent from the description and drawings, and from the claims.

BRIEF DESCRIPTION OF THE DRAWINGS

Like reference symbols in the various drawings indicate like elements.

DETAILED DESCRIPTION

As was described above, a goal with the various embodiments of the disclosure is to improve the training of multi-task neural networks, by constructing batches for each task, where the batches include samples that are selected such that the neural network is appropriately challenged for each task it is designed to perform and that no task is preferentially treated over another task. This is accomplished by using batch miners that mine samples from different dataset—typically one dataset per task—and the cost of the individual mined samples are assessed by the neural network. If the cost of processing a task using the sample is deemed to be "just right," as defined by an upper and a lower threshold for the task, the sample is added to a batch for that task. Otherwise, the sample is discarded. Once a batch is complete, the batch is used to train the neural network for that particular task. Using this method of selecting samples to be included in the training sets (i.e., batches) for the neural network, ensures that each task at any given moment is trained at a level that is neither too easy nor too difficult for the neural network. Since all the tasks in the multi-task neural network are challenged at a comparable level at any given time, the above described problem with one task outperforming the other tasks can be avoided, or at least significantly mitigated. Various embodiments of the disclosure will now be described by way of example and with reference to the drawings.

Figure 1:
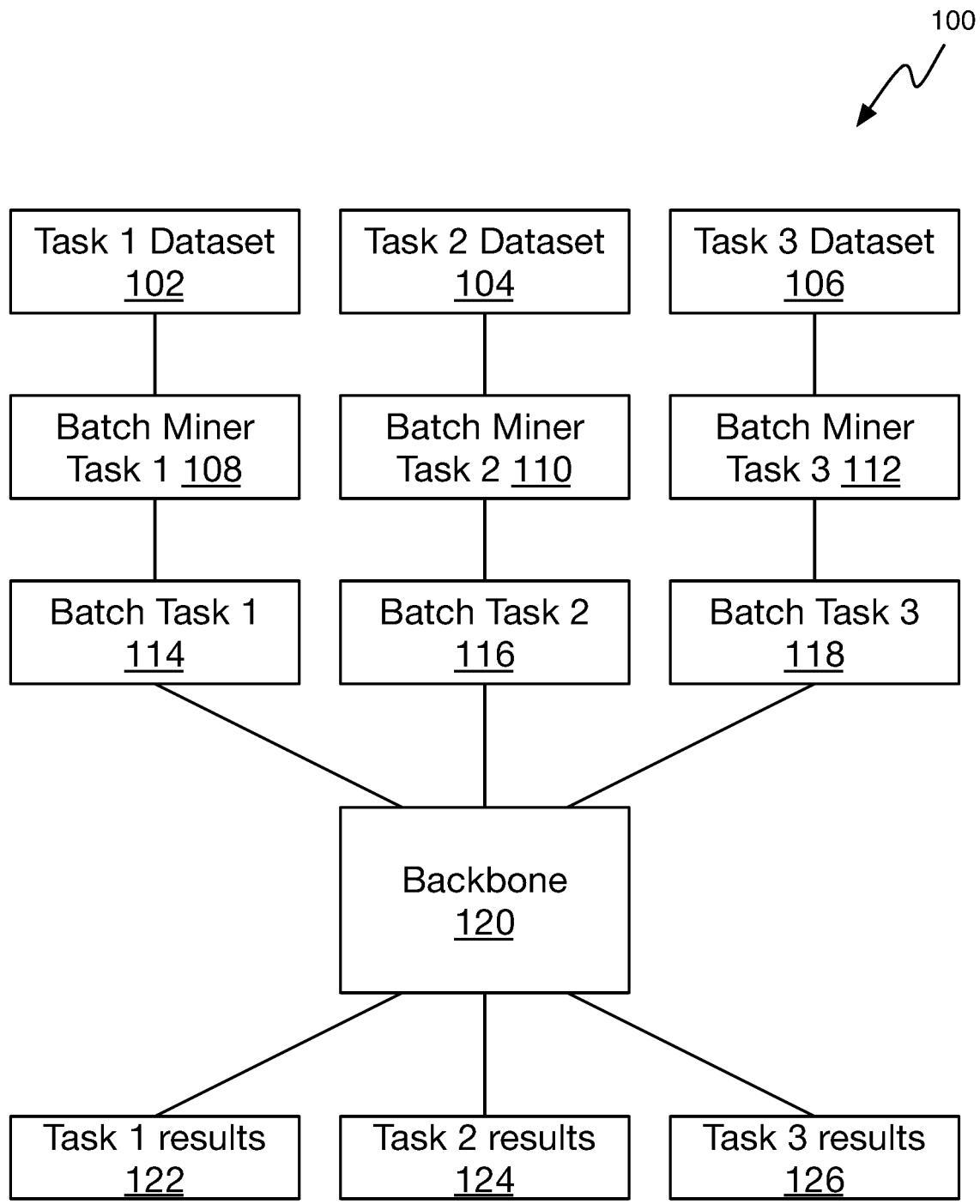
FIG. 1 is a schematic block diagram showing an exemplary system 100 for training a multi-task neural network, in accordance with one embodiment.

FIG. 1 is a schematic block diagram showing an exemplary system 100 for training a multi-task neural network, in accordance with one embodiment. The system 100 is designed to train the neural network to perform three tasks; Task 1, Task 2, and Task 3, respectively. By way of example, Task 1 may be to identify an object class in an image (e.g., a person, a person riding a bike, a person riding a motorcycle, a car, a truck, a bus, etc.), Task 2 may be to identify a color (e.g., red, green, blue, black, etc.) and Task 3 may be to identify an appearance vector (e.g., a mathematical representation of the entire image or a portion of the image such that a comparison between images easily can be made).

In the illustrated embodiment, there are three datasets; one dataset 102 for Task 1 one dataset 104 for Task 2, and one dataset 106 for Task 3. Each dataset contains a number of samples—images in this exemplary embodiment. The samples in each dataset 102, 104, 106, are chosen to be suitable for training the multi-task neural network for that particular task. Such datasets 102, 104, 106, are commercially available from numerous sources. Each sample in the datasets 102, 104, 106, has an associated ground truth, against which the output from the neural network can be compared to determine how well the neural network can execute a particular task.

The system 100 further includes a batch miner 108, 110, 112 for each task. The role of the batch miner 108, 110, 112 is to build a batch for each corresponding task, which will be used during training of the neural network. That is, batch miner 108 builds a batch 114 for Task 1, batch miner 110 builds a batch 116 for Task 2, and batch miner 112 builds a batch 118 for Task 3, respectively. The details around how these batches 114, 116, 118 are built will be described in further detail below and with reference to the flowchart of FIG. 2. On a general level, though, a batch miner 108, 110, 112 can be described as a software component that retrieves samples from its corresponding dataset 102, 104, 106, makes a determination with respect to the cost of an individual retrieved sample, that is, how difficult it is for the neural network to process the individual retrieved sample, and either discards the sample or adds the sample to a batch 114, 116, 118, based on the determined cost.

As was mentioned above, the batches 114, 116, 118, for Task 1, Task 2 and Task 3, respectively, contain samples that have been assessed by the respective batch miners 108, 110, 112, to have the "right level of complexity" (i.e., cost within a specified range) for training the multi-task neural network. The respective batches 114, 116, 118, are processed by the backbone 120 of the neural network and generates results for Task 1, Task 2 and Task 3, respectively. These results can then be used by the neural network to adjust processing parameters of the backbone 120 and/or task specific parameters to achieve a better and more even performance of the neural network for Task 1, Task 2 and Task 3 as a whole. The actual adjusting of the processing parameters of the backbone 120 can be done using conventional techniques, such as back propagation.

Figure 2:
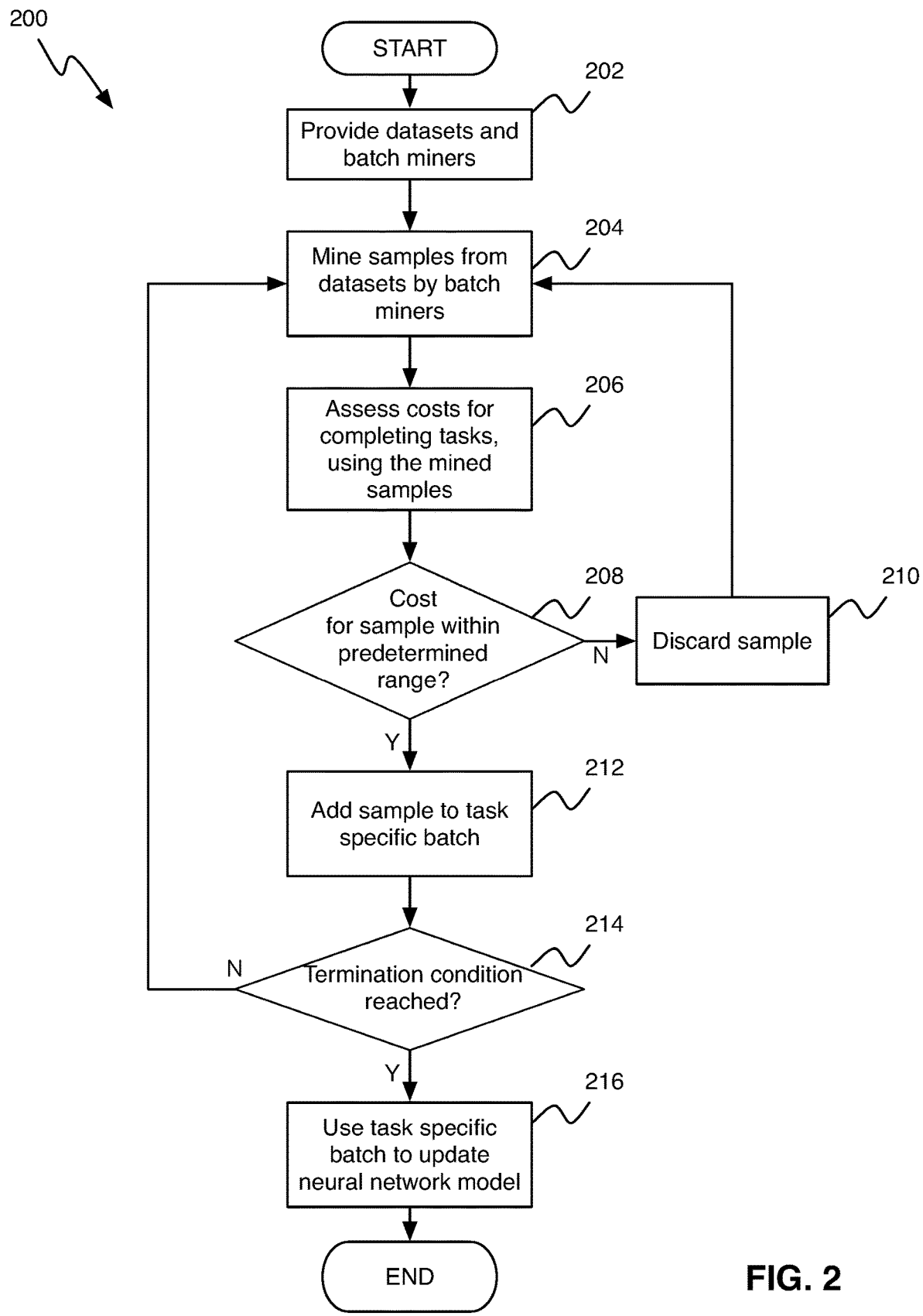
FIG. 2 is a flowchart showing a method for training a neural network, in accordance with one embodiment.

FIG. 2 shows a method 200 for training a multi-task neural network, in accordance with one embodiment. As can be seen in FIG. 2, the method starts by providing one dataset 102, 104, 106, and one batch miner 108, 110, 112, for each task, step 202. However, it should be realized that there are also other embodiments in which one or more datasets 102, 104, 106, and/or one or more batch miner 108, 110, 112 are shared between different tasks, so the embodiment shown herein should not be considered to be limiting the scope of the appended claims.

Next, the batch miners 108, 110, 112 mine samples from their respective datasets 102, 104, 106, step 204. In this context, "mining a sample" refers to selecting a sample (e.g., an image) from the dataset. The selection of an image from the dataset can be made randomly or sequentially (i.e., selecting a next image from the dataset, which has not yet been used by the batch miner). It should be noted that previously selected images may be selected anew, since the composition of the batches will change as a result of the neural network parameters changing throughout the training process of the multi-task neural network.

After selecting an image, the batch miner 108, 110, 112 determines the cost for completing the associated task, step 206. In the illustrated embodiment, this determination is done by passing the image through the neural network backbone 120, and comparing the result with the ground truth that is associated with the image. A quantitative measure is produced by a task-specific loss function.

The batch miner 108, 110, 112 then determines whether the cost (e.g., loss value) lies within a predetermined range, step 208. The predetermined range defines what is considered a level of difficulty that would be "just right," given the current parameter settings of the neural network, for doing the next round of training. In one embodiment, the range can be defined by threshold values (e.g., a loss value in the range of 0.1-0.7). The threshold values are typically set for each task, and can either be static or be dynamically calculated, for example, based on previously calculated loss values or other performance-related parameters.

If the sample has a cost that falls outside the predetermined range, the sample is discarded, step 210, and the batch miner returns to step 204 and selects a new sample. On the other hand, if the sample has a cost that falls within the predetermined range, the sample is added to a task specific batch 114, 116, 118, step 112.

Next the process checks whether a termination condition has been reached, step 114. If no termination condition has been reached, the process returns to step 204 and proceeds as described above. If a termination condition has been reached, the task specific batch is used to update the neural network model, step 216. This is done by processing the batch by the neural network, determining the loss, and then performing a back propagation to adjust the neural network parameters, as is conventional and well known among those having ordinary skill in the art.

The determination in step 214 of whether a termination condition has been reached typically relates to when a task specific batch 114, 116, 118, has been completed and contains a sufficient number of samples. This can happen in a number of ways, depending on how the different batch miners 108, 110, 112, are run with respect to each other. Typically, the size of a batch varies depending on the network model and the task at hand and contains anywhere from a handful to several hundred samples.

In one embodiment, the different batch miners 108, 110, 112, are run serially, one after another. Each batch miner is given a certain number of iterations (which is typically the same number for all the batch miners). If the batch miner, say batch miner 108, is not able to find enough appropriate samples within this number of iterations to fill a batch, it will not be allowed to introduce any changes to trained model during this training step, and the next batch miner, say batch miner 110, will do the same, and so on. This allows tasks to refrain from making additional changes to the model once the tasks have reached high performance (i.e., avoiding overfitting), thereby allowing tasks which have not yet reached high performance to take priority. To make sure that the task performance does not drop due to changes made by other tasks, the batch mining will continue to run for all tasks, such that updates to the model can be done, if needed, thus keeping all task performance at a stable, high level.

In another embodiment, the different batch miners 108, 110, 112, are run in parallel, at the same time, and the batch which is completed first is used to update the neural network. The batches are then reset, and the parallel batch mining will restart. If the neural network gets too good at performing a task, all samples picked by the batch miner will be too easy and discarded, meaning that the corresponding batch will take longer time to complete. As a result, the training will be better balanced (i.e., at any given time the neural network will be equally good at every task). Which among these embodiments is the most suitable is typically determined by the specific circumstances at hand, and fall within the capabilities of a person having ordinary skill in the art. It should also be noted that in some situations, especially where there are many tasks for which the neural network should be trained, there may be "hybrids" between these two embodiments, such that a subset of batches is built serially whereas another subset of batches is built in parallel.

While the above examples have been described in the context of convolutional neural network and images, the same general principles of creating batches with an appropriate level of difficulties can also be applied in the context of other types of neural networks or other types of data, such as text recognition, voice recognition, etc., just to mention a couple of alternatives. The general principles described herein can be applied as long as there is an input, an output, a ground truth, and a loss function.

Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that a person skilled in the art can modify the above-described embodiments in many ways and still use the advantages of the disclosure as shown in the embodiments above. Thus, the disclosure should not be limited to the described embodiments but should only be defined by the appended claims. Additionally, as the skilled person understands, the shown embodiments may be combined.

What is claimed is:

1. A computer-implemented method for training a multi-task neural network to detect features of an image captured by a camera, the method comprising:
providing at least a first dataset containing a first set of annotated images, and a second dataset containing a second set of annotated images;
providing a first batch miner for mining annotated images from the first dataset and a second batch miner for mining annotated images from the second dataset;
determining a first loss value for a first task, wherein the first task comprises processing, by the neural network, a first annotated image mined by the first batch miner from the first dataset;
determining a second loss value for a second task, wherein the second task comprises processing, by the neural network, a second annotated image mined by the second batch miner from the second data set;
if the first loss value falls within a range delimited by a first lower threshold value and a first upper threshold value, including the first annotated image in a first batch, wherein the first lower and upper threshold values are defined based on a current level for training the neural network;
if the second loss value falls within a range delimited by a second lower threshold value and a second upper threshold value, including the second annotated image in a second batch, wherein the second lower and upper threshold values are defined based on the current level for training the neural network; and
in response to reaching a termination condition for either the first batch or the second batch, using the first batch or the second batch to train the neural network.

2. The method of claim 1, further comprising:
repeating the determining and including steps until the termination condition is reached; and
wherein the termination condition includes one or more of:
the first batch or the second batch reaching a pre-determined size, and
a pre-determined number of repetitions of the determining and including steps has been performed.

3. The method of claim 1, wherein determining the first loss value and determining the second loss value are performed in sequence, one after another.

4. The method of claim 1, wherein determining the first loss value and determining the second loss value are performed in parallel, and wherein the batch that is completed first is used to train the neural network.

5. The method of claim 1, further comprising:
starting a new first batch after the first batch has been used to train the neural network; and
starting a new second batch after the second batch has been used to train the neural network.

6. The method of claim 1, further comprising:
starting a new first batch and a new second batch after the first batch or the second batch has been used to train the neural network.

7. The method of claim 1, wherein the first and second loss values are determined based on processing the annotated images by the neural network and comparing a result of the processing with respect to ground truths for the annotated images.

8. The method of claim 1, wherein the first lower threshold value is the same as the second lower threshold value, and wherein the first upper threshold value is the same as the second upper threshold value.

9. The method of claim 1, wherein the number of annotated images in the first batch is equal to the number of annotated images in the second batch.

10. A system for training a multitask neural network to detect features of an image captured by a camera, comprising:
a memory; and
a processor,
wherein the memory contains instructions that when executed by the processor causes the processor to perform a method that includes:
providing at least a first dataset containing a first set of annotated images and a second dataset containing a second set of annotated images;
providing a first batch miner for mining annotated images from the first dataset and a second batch miner for mining annotated images from the second dataset;
determining a first loss value for a first task, wherein the first task comprises processing, by the neural network, a first annotated image mined by the first batch miner from the first dataset;
determining a second loss value for a second task, wherein the second task comprises processing, by the neural network, a second annotated image mined by the second batch miner from the second data set;
if the first loss value falls within a range delimited by a first lower threshold value and a first upper threshold value, including the first annotate image in a first batch, wherein the first lower and upper threshold values are defined based on a current level for training the neural network;
if the second loss value falls within a range delimited by a second lower threshold value and a second upper threshold value, including the second annotate image in a second batch, wherein the second lower and upper threshold values are defined based on the current level for training the neural network; and
in response to reaching a termination condition for either the first batch or the second batch, using the first batch or the second batch to train the neural network.

11. A non-transitory computer-readable storage medium having stored thereon instructions being executable by a processor to perform a method comprising:
providing at least a first dataset containing a first set of annotated images and a second dataset containing a second set of annotated images;
providing a first batch miner for mining annotated images from the first dataset and a second batch miner for mining annotated images from the second dataset;
determining a first loss value for a first task, wherein the first task comprises processing, by a neural network, a first annotated image mined by the first batch miner from the first dataset;
determining a second loss value for a second task, wherein the second task comprises processing, by the neural network, a second annotated image mined by the second batch miner from the second data set;
if the first loss value falls within a range delimited by a first lower threshold value and a first upper threshold value, including the first annotated image in a first batch, wherein the first lower and upper threshold values are defined based on a current level for training the neural network;

if the second loss value falls within a range delimited by a second lower threshold loss value and a second upper threshold loss value, include the second annotated image in a second batch, wherein the second lower and upper threshold values are defined based on the current level for training the neural network; and in response to reaching a termination condition for either the first batch or the second batch, using the first batch or the second batch to train the neural network.

* * * * *